(No Model.) 2 Sheets—Sheet 1.

J. HARTNESS.
BELT SHIPPER.

No. 467,097. Patented Jan. 12, 1892.

WITNESSES. INVENTOR.

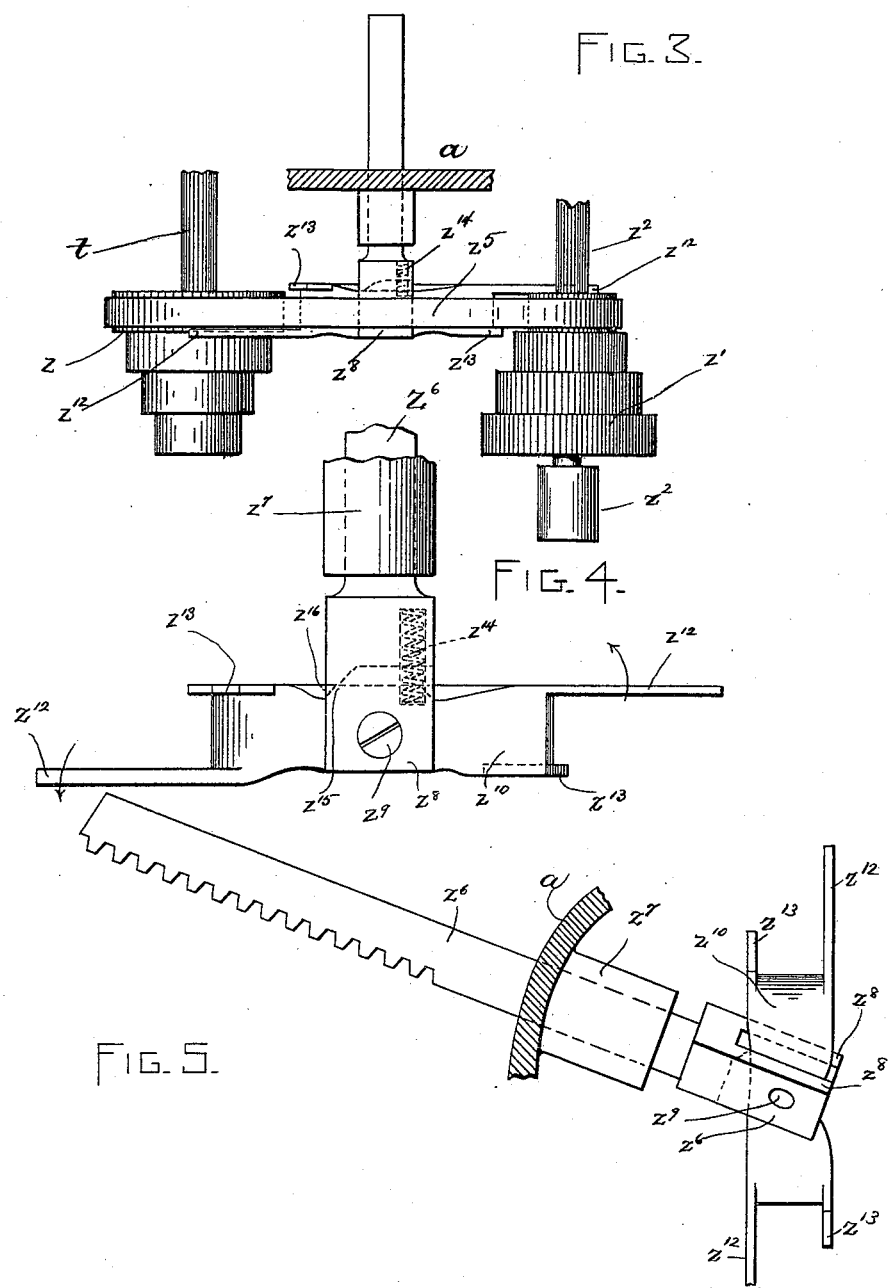

UNITED STATES PATENT OFFICE.

JAMES HARTNESS, OF SPRINGFIELD, VERMONT.

BELT-SHIPPER.

SPECIFICATION forming part of Letters Patent No. 467,097, dated January 12, 1892.

Application filed May 15, 1891. Serial No. 392,937. (No model.)

*To all whom it may concern:*

Be it known that I, JAMES HARTNESS, of Springfield, in the county of Windsor and State of Vermont, have invented certain new and useful Improvements in Belt-Shippers, of which the following is a specification.

This invention has for its object to provide a belt-shipping device adapted to shift a belt which runs on cone or step pulleys, one of which increases in diameter in the same direction that the other decreases, so that when the belt is shifted it moves from a smaller to a larger step on one pulley and from a larger to a smaller step on the other pulley.

The invention consists in the improvements which I will now proceed to describe.

Figure 1:
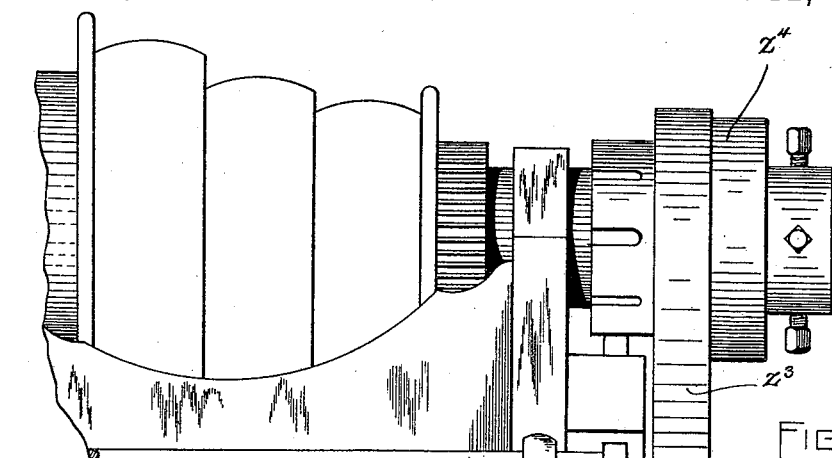
Figure 2:
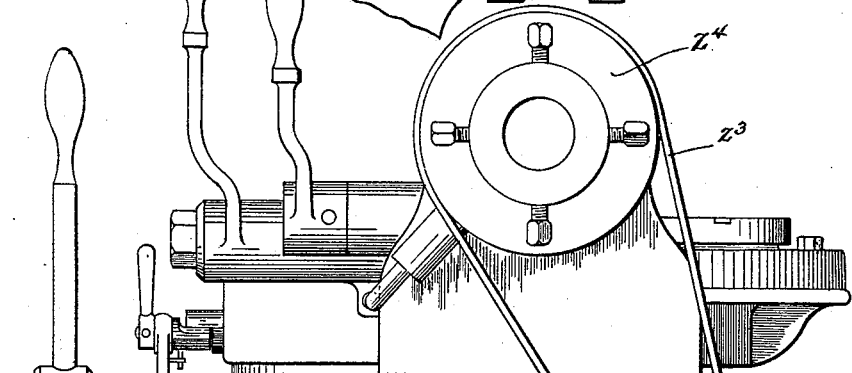

Of the accompanying drawings, forming a part of this specification, Figure 1 represents a side elevation of a portion of a lathe having my improved belt-shipping device. Fig. 2 represents an end view of the part shown in Fig. 1. Fig. 3 represents a top view of a part of the construction shown in Fig. 1. Fig. 4 represents a top view of the belt-shipper on a larger scale than that shown in Fig. 3. Fig. 5 represents a side view of the shipper and its operating-rack.

The same letters of reference indicate the same parts in all the figures.

My improved belt-shipper has been used by me in connection with a lathe and as a means for shifting a belt that connects the two step or cone pulleys $z$ and $z'$, mounted, respectively, on the feed-shaft $t$ and a shaft $z^2$, which receives motion from the feed-shaft. I do not, however, confine myself to the use of said shipper in a lathe and may use it in any machine employing reversely-arranged step or cone pulleys. The feed-shaft $t$ is provided at one end with the usual cone-pulley $z$ and receives motion from the cone-pulley $z'$ upon the shaft $z^2$, which is connected by a belt $z^3$ with a pulley $z^4$ on the spindle of the lathe, the pulleys $z$ and $z'$ being connected by belt $z^5$.

My improved shipping device comprises a longitudinally-movable slide or rack $z^6$, which is fitted to slide in an inclined guide or socket $z^7$ in the bed $a$ of the lathe and has its outer end enlarged and provided with ears $z^8$ $z^8$, to which are connected by a pivot $z^9$ the shipper-bar $z^{10}$. Said bar is arranged in an inclined position, as shown in Fig. 2, so that one of its ends is above the cone-pulley $z$ on the feed-shaft $t$, while its other end is below the cone-pulley $z'$ on the shaft $z^2$. The inclination of the slide or rack $z^6$ is such that when the rack is moved lengthwise the ends of the shipper-bar will move in lines parallel with the pitch or longitudinal inclination of the respective pulleys $z$ and $z'$, said pulleys being reversely arranged, so that the inclination of the under side of one is in a line parallel with the upper side of the other. The ends of the shipper-bar are provided with belt-engaging fingers, each end having an elongated finger $z^{12}$, which extends in the general direction of the length of the bar and is preferably slightly curved, and a shorter finger $z^{13}$, which extends substantially at right angles to the direction of the length of the bar and is arranged at the opposite edge of the bar from the finger $z^{12}$. The longer finger at one end of the bar is arranged at the opposite edge of the bar from the longer finger at the other end, and the same is true of the shorter fingers.

It will be seen by reference to Fig. 4 that the longer fingers $z^{12}$ are arranged to act in moving the belt from a smaller to a larger step of the accompanying pulley, the shorter fingers $z^{13}$ acting to keep the belt in engagement with the shipper-bar, the fingers $z^{13}$ being at one edge and the fingers $z^{12}$ at the opposite edge of the belt.

The described form and arrangement of the shipper-bar and means for giving it motion in a direction parallel with the inclination of the portions of the pulleys with which the ends of the bar co operate enable the bar to readily shift the belt from a smaller to a larger step on one pulley and at the same time from a larger to a smaller step on the other pulley. The pivotal connection of the shipper-bar on the ends on the rack $z^6$ gives the bar a certain freedom to swing longitudinally, and thereby enables it to perform the operation of shipping the belt. A spring $z^{14}$, placed in the socket in the enlarged outer end of the rack $z^6$ and bearing at its outer end on the shipper-bar at one side of the pivot $z^9$, holds said shipper-bar at $z^{15}$ against a shoulder $z^{16}$, Fig. 4, on the enlarged outer end of the rack, said spring normally holding the shipper-bar in the position shown in Fig. 5 and enabling its longer fingers $z^{12}$ to yield in the directions indicated by the arrows on said fingers, and thus act yieldingly in shipping the belt from the smaller to the larger sections of each pulley.

The shipper-bar is moved to shift the belt by means of a pinion $z^{17}$ on a shaft $z^{18}$, which is journaled in bearings in the bed $a$ and is provided with a crank $z^{19}$, arranged to be grasped by the operator, who is enabled by turning the crank to move the shipper-bar in one direction or the other, as the case may be.

The slide $z^6$ of the belt-shipper may be operated by any suitable means instead of by the rack-teeth and pinion.

I claim—

1. The combination of the reversely-arranged cone-pulleys, the inclined slide mounted in a fixed inclined guide, a double-ended shipper-bar carried by said slide and provided with belt-engaging fingers at each end, and means for moving the slide to impart a lateral motion to the shipper-bar, as set forth.

2. The combination, with the reversely-arranged cone-pulleys, of the shipper-bar arranged in an inclined position with one end below one pulley and the other end above the other pulley, an inclined rack or slide, to which said shipper-bar is pivotally connected at a point between its ends, and means for moving said slide to impart a lateral movement to the bar in either direction, the bar having belt-engaging fingers at its ends, as set forth.

3. The combination of the reversely-arranged cone-pulleys, the inclined rack or slide mounted in a fixed inclined guide, the shipper-bar centrally pivoted to the slide and having belt-engaging fingers at its ends, a spring whereby the shipper-bar is yieldingly held against a shoulder on the slide, and means for moving the slide to impart a lateral motion to the shipper-bar, as set forth.

4. The combination of the reversely-arranged cone-pulleys, the inclined rack or slide mounted in a fixed inclined guide, the shipper-bar centrally pivoted to the slide and having belt-engaging fingers at its ends, a spring whereby the shipper-bar is yieldingly held against a shoulder on the slide, and a slide-operating shaft having a pinion engaging the rack-teeth on the slide, and a crank or handle whereby said pinion may be rotated, as set forth.

In testimony whereof I have signed my name to this specification, in the presence of two subscribing witnesses, this 6th day of May, A. D. 1891.

JAMES HARTNESS.

Witnesses:
W. D. WOOLSON,
C. G. RICHARDSON.